UNITED STATES PATENT OFFICE.

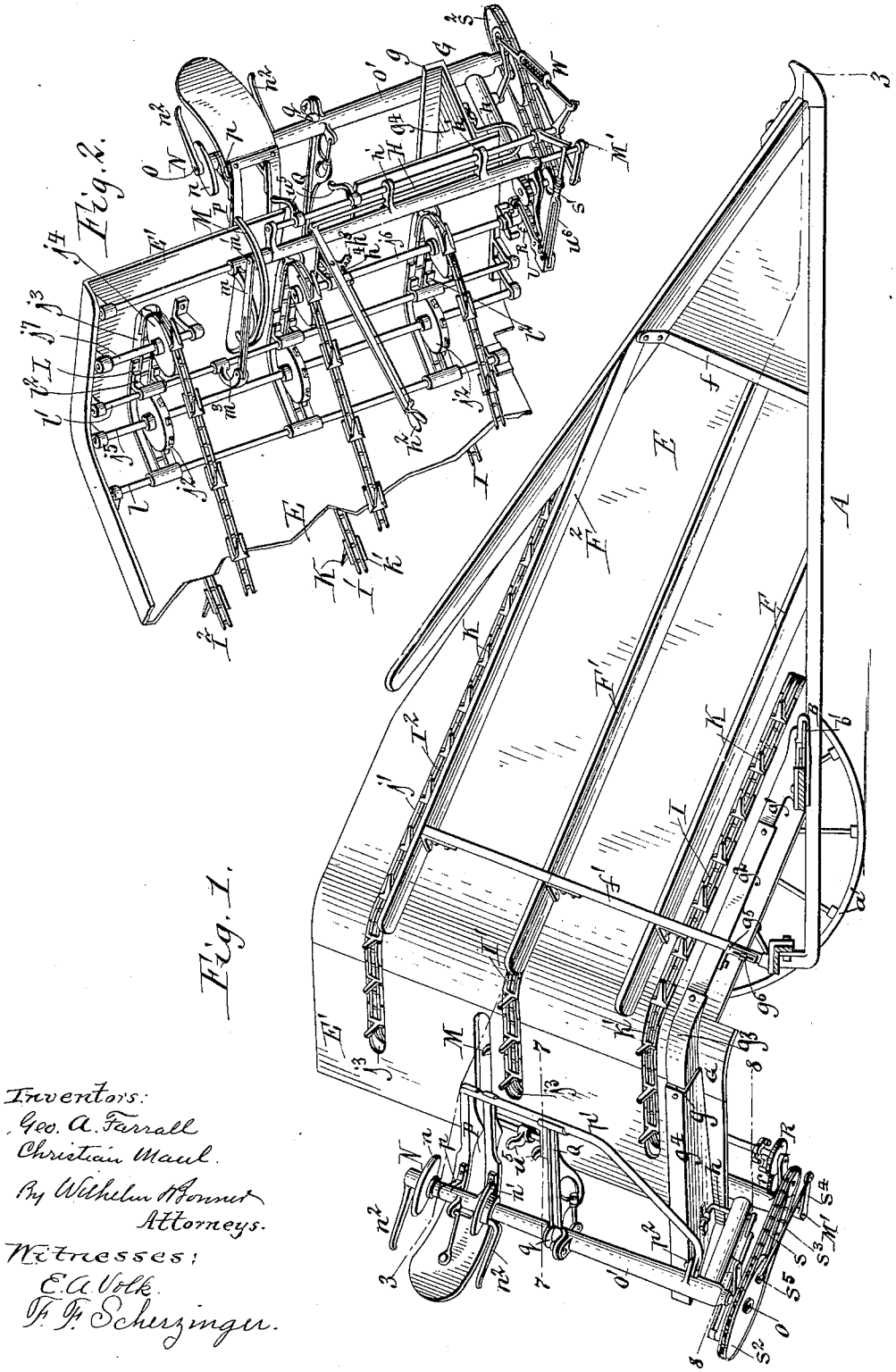

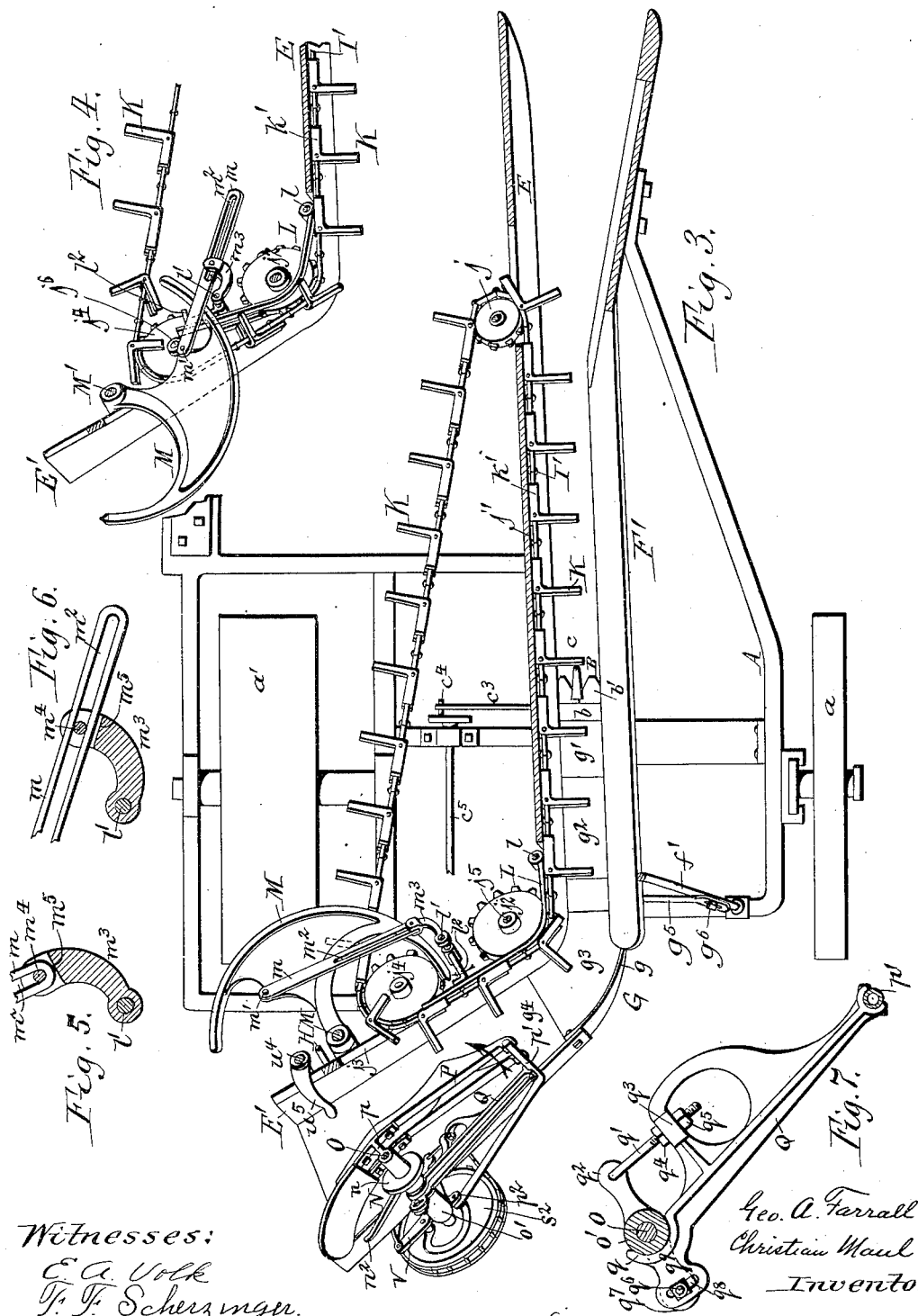

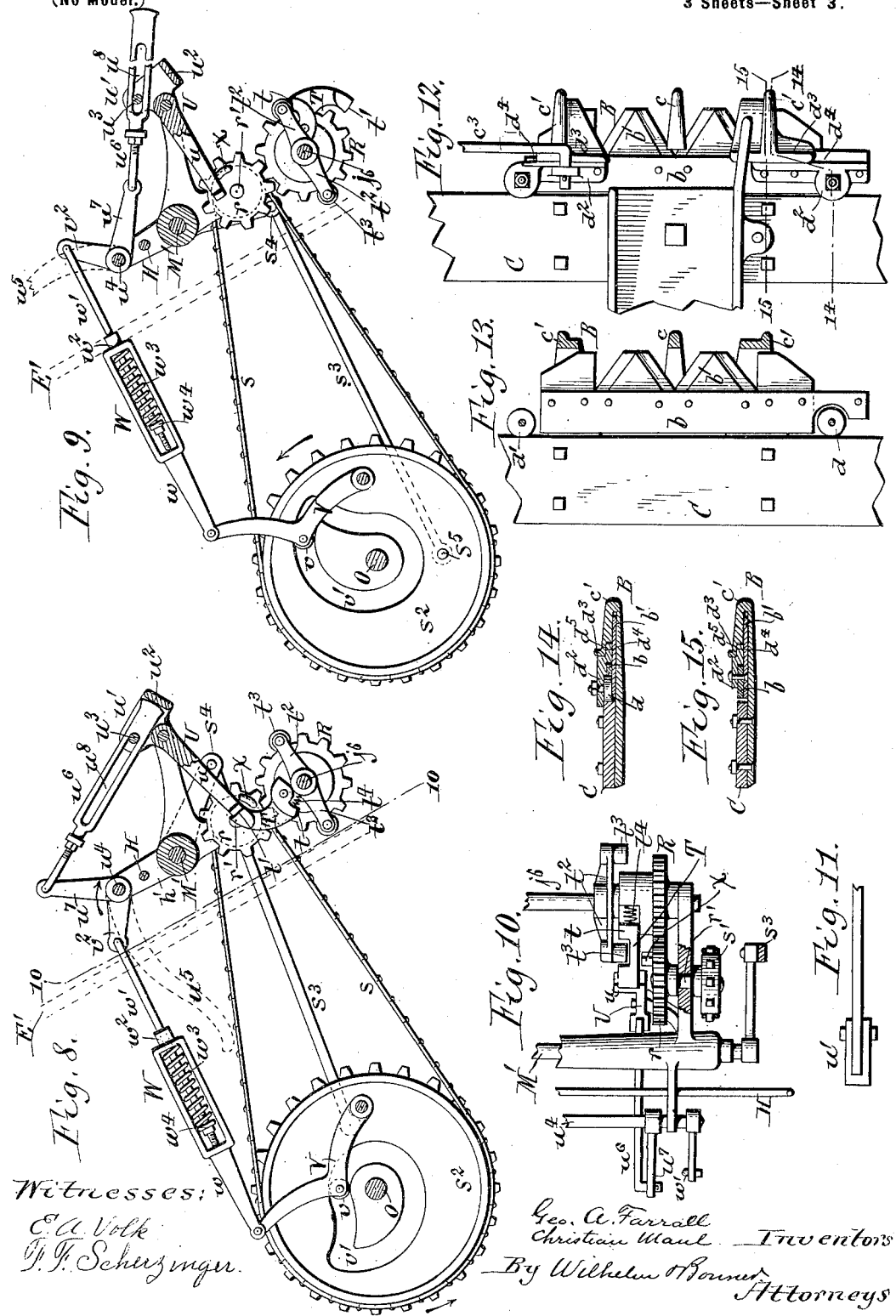

GEORGE ALBERT FARRALL AND CHRISTIAN MAUL, OF BATAVIA, NEW YORK, ASSIGNORS TO THE JOHNSTON HARVESTER COMPANY, OF SAME PLACE.

CORN-HARVESTER.

SPECIFICATION forming part of Letters Patent No. 657,215, dated September 4, 1900.

Application filed August 25, 1899. Serial No. 728,477. (No model.)

*To all whom it may concern:*

Be it known that we, GEORGE ALBERT FARRALL and CHRISTIAN MAUL, citizens of the United States, residing at Batavia, in the county of Genesee and State of New York, have invented new and useful Improvements in Corn-Harvesters, of which the following is a specification.

This invention relates to a corn-harvester of the general type which is shown and described in Letters Patent of the United States granted to the Johnston Harvester Company, No. 603,759, dated May 10, 1898.

The object of the present invention is to improve this type of harvesters in several respects.

The harvester referred to contains a platform which is arranged lengthwise to the line of draft and which is mainly upright but inclines stubbleward, so that its bearing-surface faces grainward and upward. A binder-deck extends stubbleward from the rear end of the platform and conveyer-belts run along the platform and binder-deck. These belts are provided with pivoted teeth, which fold back in running along the binder-deck when they are not required to convey stalks, and the position of the teeth, whether projecting or folded back, is controlled by a pivoted guide arranged in the binder-deck.

One object of our invention is to improve the construction and arrangement of this guide and of the mechanism by which it is shifted or swung on its pivot from one position to the other, so as to render these parts strong and rigid and enable the guide to be easily shifted and to be securely held in position against the pressure of the teeth.

Another object of our invention is to improve and simplify the construction of the means by which the binding mechanism is actuated, so that it is rendered compact and can be arranged higher than formerly in the machine, whereby clogging of the mechanism by foreign matter is avoided.

Another object of our invention is to improve the devices for adjusting the breast-plate at the stubbleward end of the binder-deck.

Other objects of our invention are to improve the cutter mechanism by providing it with guiding and antifriction devices and to improve the means by which the bottom of the throat or stalk-passage is raised and lowered.

In the accompanying drawings, consisting of three sheets, Figure 1 is a side elevation of our improved harvester viewed from the grainward side. Fig. 2 is a fragmentary side elevation thereof viewed from the stubbleward side. Fig. 3 is a horizontal section of the harvester, taken substantially in line 3 3, Fig. 1, and showing the binder-needle retracted and the adjacent feeding-teeth in an operative position. Fig. 4 is a similar view showing the binder-needle projected and the adjacent feeding-teeth folded into an inoperative position. Fig. 5 is a fragmentary horizontal section, on an enlarged scale, of the crank and connecting-rod whereby the feeding-teeth guides are operated and showing the position of these parts when the guides are in their operative position. Fig. 6 is a similar view showing the position of the same parts when the guides are in their inoperative position. Fig. 7 is a horizontal section, on an enlarged scale, in line 7 7, Fig. 1. Fig. 8 is a horizontal section, on an enlarged scale, of the binder-driving mechanism in line 8 8, Fig. 1, and showing the position of the parts when the binder mechanism is not in operation. Fig. 9 is a similar view showing the position of the parts when the binder mechanism is in operation. Fig. 10 is a fragmentary sectional elevation in line 10 10, Fig. 8. Fig. 11 is an end view of the binder trip-lever and its actuating rod or bar. Fig. 12 is a fragmentary top plan view, on an enlarged scale, of the cutter mechanism. Fig. 13 is a horizontal section of the same. Figs. 14 and 15 are vertical sections of the cutter mechanism taken in lines 14 14 and 15 15, Fig. 12, respectively.

Like letters of reference refer to like parts in the several figures.

A represents the main frame of the harvester, which is supported on the grainward side by a supporting-wheel $a$ and on its stubbleward side by a driving-wheel $a'$.

B represents the cutter mechanism whereby the cornstalks are cut off and which is arranged on the lower portion of the main frame. This cutter, Figs. 1, 3 and 12 to 15, consists, essentially, of a transversely-reciprocating cutter-bar $b$, provided with knife sections or blades $b'$, a transverse finger-bar C, arranged in rear of the cutter-bar, and fingers or guards $c\ c'$, projecting forwardly from the finger-bar and coöperating with the blades of the cutter-bar.

In order to permit the cutter to work easy, the same is provided with antifriction-rollers $d\ d'$, which are mounted on the inner and outer ends of the cutter-bar and bear against the front side of the finger-bar, as represented in Figs. 12 to 15. Each of these rollers is pivoted to the under side of a guard cap or plate $d^2$, which is secured to the top of the cutter-bar and projects rearwardly over the finger-bar, as shown in Figs. 12 and 14, so as to prevent any obstruction from entering between the roller and the finger-bar and clogging the same. The front part of each cap extends underneath the overhanging part $d^3$ of the adjacent side guard or finger $c'$ and is guided thereon by coöperating guide-faces $d^4\ d^5$, arranged, respectively, on these parts. The cutter-bar may be reciprocated in any suitable or well-known manner—for instance, by means of a pitman $c^3$, connected at one end with the cutter-bar and at its opposite end to a crank $c^4$ on a shaft $c^5$, as shown partly in Fig. 3 and partly in Fig. 12.

E represents the inclined conveyer-platform, which is arranged lengthwise on the main frame with its lower portion adjacent to the stubbleward side of the cutter and which leans toward the driving-wheel.

E' represents the inclined binder-deck, which extends rearwardly and stubbleward from the rear end of the platform. The platform and deck form the stubbleward side of the throat or passage through which the stalks pass. The grainward side of this throat or passage consists principally of three guide-bars F F' F², which extend lengthwise of the platform and are supported on the main frame by standards $f\ f'$.

G represents the bottom of the throat, upon which the butt-ends of the stalks rest as they pass through the throat. This bottom extends from the rear side of the cutter along the lower portions of the platform and the binder-deck and bears loosely with its inner or stubbleward edge against the platform and binder-deck, while its outer edge is provided with an upwardly-projecting guard-rim $g$, which confines the butts of the stalks on the bottom. The latter is capable of vertical adjustment to suit different lengths of stalks. For this purpose the bottom is made up of a number of pivotally-connected sections $g'\ g^2\ g^3\ g^4$. The first or front section $g'$ is stationary and secured to the frame in rear of the cutter, the second section $g^2$ extends along the platform, the third section $g^3$ is curved to conform to the adjacent curved corner at the junction of the platform and deck, and the fourth section $g^4$ extends along the binder-deck. The middle part of the bottom is adjustably supported by a bracket $g^5$, secured to the second bottom section and connected with the adjacent standard $f'$ by a bolt $g^6$, passing through a vertical slot in the bracket, as shown in Fig. 1.

H is an upright shifting rod arranged in rear of the deck and provided at its lower end with a curved arm $h$, which extends underneath the lower edge of the deck and upwardly to the throat-bottom, to which latter the arm is pivotally connected. Upon raising or lowering the shifting rod the rear part of the throat-bottom is raised or lowered. The shifting rod is guided in lugs $h'$, arranged on the adjacent stationary part of the machine, and the rod is raised and lowered by a hand-lever $h^2$, which is pivoted on the main frame and connected with its rear arm to the upper end of the shifting rod, while its front arm extends to a point in convenient reach of the driver. The rear part of the throat-bottom is held in its adjusted position by any suitable device, which is controlled by the driver—for instance, a segment $h^3$ and a catch $h^4$, which is mounted on the lever $h^2$. The front part of the throat-bottom is stationary, as stated. The middle part is vertically adjusted by adjusting the bracket $g^5$ to suit the average length of stalks which are being cut and is secured in this position. The position of the rear part of the throat-bottom is controlled by the driver, and this part is raised or lowered as the cutting progresses to suit the varying lengths of the stalks, so that all bundles are tied approximately in the middle by the binder mechanism.

I I' I² represent conveyer or feed belts whereby the stalks are carried through the throat to the binder mechanism. These belts are arranged lengthwise of the platform and binder-deck, and each belt passes with its receiving portion around a guide-roller $j$, thence through an opening in the platform and rearwardly along a guide $j'$ on the bearing side of the platform, thence rearwardly and stubbleward around a sprocket-wheel $j^2$, thence rearwardly through a slot $j^3$ in the binder-deck, and thence forwardly around a delivery sprocket-wheel $j^4$ to the place of beginning. Each of the guide-rollers $j$ is journaled in a bracket secured to the platform. The intermediate sprocket-wheels $j^2$ of the several feed-belts are secured to an upright shaft $j^5$. The delivery sprocket-wheels $j^4$ of the lower and intermediate feed-belts I I' are mounted on an upright shaft $j^6$, and the delivery sprocket-wheel $j^4$ of the upper feed-belt is mounted on a separate shaft $j^7$, which is arranged axially in line with the lower shaft $j^6$. The feed-belts may be driven from the driving-wheel in the same manner as in the patent heretofore referred to. Each of the feed-belts is provided at intervals with feeding teeth or fingers K, which project laterally therefrom into the throat or stalk-passage when in their operative position. The inner end of each tooth is pivoted to a feed-belt and is provided with two trailing guide-shoes $k'$, which project backwardly at right angles to the tooth and straddle the feed-belt. As the teeth move along the bearing side of the platform their shoes engage with the bottom of the guides $j'$ and hold the teeth at right angles to the platform, in which position the teeth carry the stalks through the throat.

L represents movable guide-bars whereby the teeth on the delivery part of the feed-belts are held either in their operative position for feeding the stalks to the binder mechanism or are permitted to fold backwardly against the feed-belt into an inoperative position, so as to check the feeding action of the belts while the binder mechanism is tying a band around a bundle. These guide-bars are arranged in pairs on opposite sides of the delivery part of each belt in the adjacent slot $j^3$ and extend from the rear part of the platform rearwardly, thence stubbleward in a curve adjacent to the intermediate sprocket-wheels, and thence obliquely to the delivery sprocket-wheels. The front ends of the guide-bars are connected to an upright rock-shaft $l$. In the operative position of the guide-bars the same are swung forward into the slots $j^3$, so as to be arranged close to the feed-belts, as represented in Fig. 3. While in this position the shoes of the feeding-teeth engage with the guide-bars and are held parallel with the belts, whereby the teeth are caused to project from the deck and feed the stalks to the binder mechanism. Upon swinging the guide-bars backwardly from the feed-belts, as represented in Fig. 4, the support for the shoes is removed, which causes the teeth to be folded backwardly against the feed-belts into an inoperative position, as shown in Fig. 4, whereby the feed of stalks is checked.

$l'$ is an upright rock-shaft, which is journaled on the deck between the intermediate and delivery sprocket-wheels and which is provided with a number of shifting arms or cams $l^2$, by which the position of the guide-bars is controlled.

In the operative position of the guide-bars the rock-shaft $l'$ is turned forwardly, so that its shifting arms bear squarely against the back of the guide-bars, near the free ends thereof, as represented in Fig. 3, whereby the feeding-teeth passing along the deck are held in an operative position. Upon turning the rock-shaft $l'$ backwardly in the direction of the arrow, Fig. 3, the shifting arms are swung away from the guide-bars and permit the latter to recede from the feed-belts, thereby causing the feeding-teeth to fold back into an inoperative position, as shown in Fig. 4.

M represents the binder-needle, which is arranged under the binder-deck and which passes at intervals through a slot in the deck and coöperates with the knotter mechanism N, arranged on the opposite side of the stalk-throat for tying a band around the bundle. The knotter mechanism may be of any suitable construction, and therefore only the cams $n$ $n'$ of the same are shown for the purpose of locating the knotter mechanism. The binder-needle is mounted on the upper end of a rock-shaft $M'$, which is journaled in bearings behind the deck.

$m$ represents a connecting-bar pivoted at one end to a crank $m'$ on the needle and provided at its inner end with a slot $m^2$.

$m^3$ is an actuating rock-arm which is secured to the rock-shaft $l'$ and provided at its free end with a bifurcation which receives the slotted end of the connecting-bar and which is provided with a pin $m^4$, passing through the slot thereof. In the retracted or inoperative position of the needle the connecting-bar pivoted thereto engages the outer end of its slot with the pin of the bifurcated rock-arm $m^3$ and turns the latter, together with the rock-shaft $l'$ and the shifting arms connected therewith, so that the latter hold the guide-bars and the feeding-teeth in an operative position, as shown in Figs. 3 and 5. As the needle begins to move forward across the throat for tying a bundle the outer end of the connecting-bar engages with the shoulder or abutment $m^5$ at the back of the bifurcated arm $m^3$ and turns the same in the direction of the arrow, Fig. 3, until the outer end of the connecting-bar clears the shoulder $m^5$, whereby the rock-shaft $l'$ is turned so that its shifting arms are retracted and permit the guide-bars and feeding-teeth to move into an inoperative position, as shown in Fig. 4. After the connecting-bar has cleared the shoulder of the bifurcated rock-arm the continued or last part of the forward movement of the needle causes the connecting-bar to slide with its slot on the pin $m^4$ until it reaches the end of its forward movement, as represented in Figs. 4 and 6, during which movement the rock-shaft $l'$ and connecting parts are not moved. During the first part of the subsequent backward movement of the needle the connecting-bar slides idly on the pin $m^4$ until the outer end of the slot in said bar engages with the pin, after which the connecting-bar during the last part of its backward movement with the needle shifts the bifurcated rock-arm, together with the shaft $l'$ and shifting arms $l^2$, so as to move the guide-bars and the feeding-teeth into an operative position. During the last part of the outward movement of the connecting-bar its inner end is swung opposite the shoulder $m^5$ of the rock-arm preparatory to shifting the same during the next inward movement of the connecting-bar.

In the above-described mechanism the guide-bars are pivoted at their front ends to the platform and are movable at their rear ends toward and from the binder-deck and are held in their operative position by the shifting arms, which connect the rear ends of the guide-bars through intermediate parts with the needle, whereby a very strong and rigid support for the guide-bars is secured.

O represents the upright shaft of the knotter mechanism, which is journaled in a standard $o'$, arranged opposite the binder-deck on the grainward side thereof.

P represents the breastplate, which is arranged opposite the binder-needle and provided on its central part with two outwardly-projecting arms $p$ $p$, which are mounted loosely on the upper end of the knotter-shaft. The front end of the breastplate is secured to an upright supporting-rod $p'$, which is arranged with its upper part parallel with the knotter-shaft and which inclines with its lower part toward the standard $o'$ and is secured to a lug thereon by a bolt $p^2$, as shown in Fig. 1.

For the purpose of adjusting the knotter mechanism to the binder-needle, the breastplate carrying the binder mechanism is turned on the knotter-shaft so as to move its front part toward and from the deck. In order to effect this adjustment without straining any of the parts, the following device is provided:

Q represents an adjusting-arm secured at its front end to the supporting-rod $p'$ below the breastplate and provided at its rear end with a semicircular socket $q$, which fits concentrically against the circular rear or outer side of the standard $o'$ below the knotter mechanism, as shown in Figs. 1, 2, 3, and 7.

$q'$ is an adjusting-rod which is connected at its rear end to an inwardly-projecting lug $q^2$, arranged on the standard $o'$, and which passes with its screw-threaded front end through an eye $q^3$ on the inner side of the adjusting-arm Q.

$q^4$ $q^5$ are screw-nuts arranged on the adjusting-rod in front and in rear of the eye $q^3$. Upon loosening the rear nut $q^4$ and tightening the front nut the adjusting-arm is swung inwardly in the direction of the arrow, Fig. 3, whereby the breastplate is moved toward the deck. Upon loosening the front nut $q^5$ and tightening the rear nut $q^4$ the adjusting-arm is swung outwardly and the breastplate is moved away from the deck. While moving the adjusting-arm inwardly or outwardly it turns concentrically with the knotter-shaft, on which the breastplate is mounted loosely, whereby these parts are not strained, which otherwise would be the case if the breastplate and the adjusting-arm were pivoted on different centers. The breastplate is held in its adjusted position by a bolt $q^6$, passing through a lug $q^7$ on the outer side of the standard $o'$, and a concentric slot $q^8$, formed in a lug $q^9$, which latter projects outwardly from the adjusting-arm, as shown in Figs. 1, 2, 3, and 7.

The mechanism for driving the binding mechanism is constructed as follows:

R represents a gear-wheel mounted loosely on the lower end of the conveyer-shaft $j^6$ or some other shaft having the same speed. This gear-wheel has twelve teeth and meshes with a gear-pinion $r$, having nine teeth, so that the relation of these gears is three rotations of the wheel to four rotations of the pinion. The gear-pinion is secured to the upper end of a short counter-shaft $r'$, which is journaled in a stationary bearing.

$s$ is a sprocket-chain which passes around a sprocket-pinion $s'$ on the lower end of the counter-shaft $r'$ and a sprocket-wheel $s^2$ on the lower end of the knotter-shaft O. The sprocket-pinion has six teeth and the sprocket-wheel twenty-four teeth, so that the relation of these sprocket-wheels is four rotations of the pinion to one rotation of the wheel. During each binding operation the knotter-shaft O and sprocket-wheel $s^2$ make one rotation, the sprocket-pinion $s'$ and gear-pinion $r$ four rotations, and the gear-wheel R three rotations. The binder-needle is oscillated by means of a rod $s^3$, connected at one end to a rock-arm $s^4$ on the lower end of the needle rock-shaft M' and with its other end to a crank $s^5$ on the sprocket-wheel $s^2$, the distance from the crank $s^5$ to the center of the sprocket-wheel $s^2$ being less than the length of the rock-arm $s^4$, so that a rotary movement of the crank imparts a rocking movement to the needle.

T represents a coupling or clutch dog which is pivoted on the gear-wheel R so as to swing laterally thereon and which is provided with an inner coupling shoulder or face $t$ and an outer uncoupling or trip face $t'$.

$t^2$ $t^2$ are two driving-arms secured to diametrically-opposite sides of the shaft $j^6$ and each provided with a depending coupling roller or lug $t^3$. When the machine is in operation, the shaft $j^6$ and its driving-arms rotate constantly. When the binder mechanism is not in operation, the coupling-dog is moved inwardly into the position shown in Fig. 8, in which position the coupling-shoulder $t$ of the dog is arranged inside of the path of the driving-lugs on the driving-arms, and the latter therefore turn without operating the binder mechanism. Upon moving the coupling-dog outwardly, so that its coupling-shoulder stands in the path of the driving-dogs, one of the latter engages this shoulder, as shown in Fig. 9, and so couples the gear-wheel R with the shaft $j^6$ and sets the binder mechanism in motion. The outward movement of the coupling-dog when released is effected by a spring $t^4$. While the binder mechanism is inoperative and the stalks are being collected on the binder-deck, the coupling-dog is held in its inner or backward position, so that the driving-lugs clear the same, by the inner arm $u$ of a trip-lever U. This lever is pivoted on the adjacent stationary part of the machine and has a bifurcated outer arm $u'$, which has a shoulder or abutment $u^2$ on one side and a transverse pin $u^3$ on the opposite side.

$u^4$ is an upright compressor-shaft journaled in rear of the deck and provided with one or more compressor-arms $u^5$, against which the stalks are piled or gathered by the conveyer.

$u^6$ is an actuating bar or rod connected at one end to a rock-arm $u^7$ on the compressor-shaft and provided in its opposite end with a longitudinal slot $u^8$, which receives the pin $u^3$ in the bifurcated outer arm $u'$ of the trip-lever.

V represents a rock-lever pivoted to the frame above the sprocket-wheel $s^2$ and provided with a roller or projection $v$, which engages with a compressor-operating cam $v'$, formed in the upper side of the sprocket-wheel $s^2$. This lever is connected with a rock-arm $v^2$ on the compressor-shaft by an elastic connecting-rod W, which permits the compressor-shaft and connecting parts to have a slight movement independent of the compressor-cam for tripping the clutch that couples the binder mechanism with the driving mechanism, but which permits of transmitting the movement of the compressor-cam to the compressor shaft and arms for releasing the bundle after being tied. This elastic link consists, essentially, of an open frame $w$, pivoted at one end to the rock-lever V, a rod $w'$, connected at one end with the rock-arm $v^2$ and sliding with its other end through an eye $w^2$ on the adjacent end of the yoke, and a spring $w^3$ interposed between said eye and a collar or shoulder $w^4$ on the rod $w'$.

While the binder mechanism is inoperative and the stalks are being gathered on the deck to form a bundle the parts of the binder mechanism are in the position shown in Figs. 1, 2, 3, 5, 8, and 10, in which position the coupling-dog is held out of engagement with the driving-lugs by the trip-lever. The compressor-shaft is turned so that the compressor-arms project across the stalk throat or passage, and the actuating-bar engages the inner end of its slot with the pin $u^3$, and its inner end stands opposite the shoulder $u^2$. When a sufficient number of stalks have been delivered by the conveyers against the compressor-arms, so that the latter yield backwardly and turn the compressor-shaft slightly in the direction of the arrow, Fig. 8, the actuating-bar is moved inwardly. During this inward movement of the bar its inner end by engaging with the shoulder $u^2$ on the outer arm of the trip-lever turns the latter so that its inner arm is disengaged from the coupling-dog. The instant the latter is released it is moved outwardly by its spring, so that its driving-shoulder stands in the path of the driving-lugs and is engaged by one of the same, thereby coupling the binder mechanism with the driving mechanism. When the compressor arms and shaft are turned by the pressure of the accumulated stalks for disengaging the trip-lever from the coupling-dog, the driving mechanism of the needle and the knotter mechanism remain stationary. The instant the dog is coupled with the driving-shaft the train of gearing begins its cycle of movement for operating the binder mechanism. During the first half-turn of the sprocket-wheel $s^2$ its crank $s^5$ moves the needle forward, and during the second half-turn the needle is moved backward. The compressor-cam is so constructed that it holds the compressor-arms across the stalk-passage until the binding operation is completed, then turns the compressor-shaft and its compressor-arms, so as to permit of discharging the bundle from the deck by means of the discharge arms $n^2$ on the knotter-shaft, and then turns this shaft at the end of the rotation of the sprocket-wheel $s^2$, so that the compressor-arms project across the stalk-passage preparatory to receiving the next bundle. When the compressor-shaft is turned for discharging the bundle, the inner end of the actuating-bar $u^6$ clears the shoulder $u^2$ of the trip-lever and slides idly with its slot along the pin $u^3$ of the same, as shown in Fig. 9, thereby avoiding an excessive movement of the trip-lever. When the compressor-cam turns the compressor-shaft for restoring the compressor-arms, the actuating-bar slides outward idly until the inner end of its slot engages with the pin $u^3$ of the trip-lever. The latter now moves with the actuating-bar to the end of its outward movement, and is turned thereby, so that its inner arm stands in the path of the trip-face of the coupling-dog. As the latter rotates it engages with the trip-lever and is thereby turned inwardly until its coupling-shoulder $t$ is disengaged from the driving-lug, when the movement of the binder mechanism ceases. During the last portion of the outward movement of the actuating-bar it swings on the pin $u^3$ as a pivot, and its inner end is carried opposite the shoulder $u^2$ of the trip-lever preparatory to engaging the same during the next inward movement of the actuating-bar.

Inasmuch as it requires three turns of the gear-wheel R in order to complete the cycle of operations of the binder mechanism, it is necessary to keep the inner arm $u$ of the trip-lever out of the path of the coupling-dog until these operations have been completed. For this purpose the gear-pinion $r$ is provided with a shifting lug or tappet $x$, which is adapted to engage with the inner arm $u$ of the trip-lever. This tappet is so arranged that it engages with the trip-lever and shifts the same out of the path of the coupling-dog during three turns of the gear-pinion, but leaves the trip-lever standing in the path of said dog at the end of the fourth turn, which is at the end of the binding operation, to permit the binder mechanism to be uncoupled from the driving mechanism. In the uncoupled position of the coupling-dog the shifting tappet stands close to the inner side of the inner arm of the trip-lever. If the trip-lever tends to drop back into its operative position after being released from the dog, the shifting tappet at the end of its first turn engages with the trip-lever and moves the same out of the path of the dog just before the latter reaches the trip-lever, and this operation is repeated during the second and third turn of the gear-pinion. The tappet is able to move the trip-lever out of the path of the approaching coupling-dog, because the speed of the gear-pinion $r$ is greater than that of the gear-wheel R, and the gear-pinion gains one-quarter of a turn on the gear during each turn of the wheels. Its tappet deflects the trip-lever during three turns sufficiently to clear the coupling-dog; but at the end of the fourth turn the gear-pinion gains one complete turn and comes around to the starting-point with reference to the gear-wheel, in which position of the pinion its shifting tappet misses or does not reach the trip-lever in time to deflect it out of the path of the coupling-dog, thereby causing the binder mechanism to be uncoupled from the driving mechanism. If the shaft from which the binder mechanism is driven has a different speed, the relative size of the gear-wheels must be changed accordingly.

This construction of the actuating mechanism of the self-binder is very compact and can therefore be placed higher up in the machine, where the available space is limited, than the mechanism heretofore employed. This avoids interference of the mechanism with the ground and greatly reduces the liability of the mechanism becoming clogged with foreign matter.

We claim as our invention—

1. The combination with the platform, the binder-deck and a conveyer-belt arranged on said platform and binder-deck and provided with folding teeth, of a guide-bar for said teeth arranged in the binder-deck and pivoted at its front end, a rigid shifting device engaging said guide-bar near its free end, and a rock-shaft for said shifting device arranged near the free end of said guide-bar, said shifting device standing substantially at right angles to the free end of the guide-bar when the latter is swung into the binder-deck for supporting the teeth, thereby holding the latter firmly against the pressure of the stalks, substantially as set forth.

2. The combination with the platform and binder-deck and a conveyer-belt provided with folding teeth, of a guide-bar for said teeth arranged in the binder-deck and pivoted at its front end, a rocking shifting arm arranged below the binder-deck and bearing against the free rear end of said guide-bar, the needle mechanism, and means whereby said shifting arm is actuated from the needle mechanism, substantially as set forth.

3. The combination with the platform and binder-deck and a conveyer-belt provided with folding teeth, of a guide-bar for said teeth arranged in the binder-deck and pivoted at its front end, a rock-shaft arranged below the binder-deck, a shifting arm secured to said rock-shaft and bearing against the free rear end of said guide-bar, an actuating-arm secured to said rock-shaft, a needle, and a slotted bar connecting the needle with said actuating-arm, substantially as set forth.

4. The combination with the rotary driving-arm, the driving-wheel of the binder mechanism, the coupling-dog mounted on said wheel, and the compressor shaft and arm, of a trip-lever whereby the coupling-dog is held out of engagement with the driving-arm and which is provided with an actuating-shoulder and a bar which is actuated from the compressor-shaft and which bears against said shoulder for moving the trip-arm to release the coupling-dog and which has a sliding connection with the trip-arm which permits the bar and the compressor-shaft to continue their movement after the trip-lever has been released from the coupling-dog, substantially as set forth.

5. The combination with the rotary driving-arm, the driving-wheel of the binder mechanism, and the coupling-dog mounted on said wheel, of a driven wheel meshing with said driving-wheel and making a greater number of turns than said driving-wheel, a tappet on the driven wheel, a trip-lever which is adapted to hold the coupling-dog out of engagement with the driving-arm and which is prevented from engaging with the coupling-dog by said tappet when the latter strikes said trip-lever, and means whereby said trip-lever is disengaged from the coupling-dog by the movement of the compressor-shaft, substantially as set forth.

6. The combination with the breastplate, and the supporting-standard about the axis of which the plate is swung in adjusting it toward and from the binder-deck, of an adjusting-arm connected at its free end with the breastplate and at its opposite end with the standard by a pivotal connection arranged concentric with the axis of the standard, and an adjustable attaching device connecting said arm with the standard, whereby in adjusting the arm by the attaching device the arm is enabled to turn about the standard without binding, substantially as set forth.

7. The combination with the breastplate and the supporting-standard about the axis of which the plate is swung in adjusting it toward and from the binder-deck, and which is provided with fastening-arms on opposite sides, of an adjusting-arm connected at its free end with the breastplate and at its opposite end with the standard by a pivotal connection arranged concentric with the axis of the standard, an adjustable bolt connecting said adjusting-arm with one of the fastening-arms of the standard, and a bolt-and-slot connection whereby the other fastening-arm of the standard is connected with said adjusting-arm, substantially as set forth.

8. The combination with the finger-bar, of a reciprocating cutter-bar carrying the knives, guard-caps which are secured to said cutter-bar and project rearwardly over the finger-bar and forwardly under the overhanging portion of the fingers, and rollers which are arranged on the lower side of these caps and bear against the front side of the finger-bar, substantially as set forth.

9. The combination with the longitudinal platform and the binder mechanism, of a throat-bottom having its rear part, adjacent to the binder mechanism, connected near its rear end to an adjusting mechanism which is controlled by the driver and having in front of said rear part a vertically-adjustable part to which said rear part is pivoted, substantially as set forth.

10. The combination with the inclined binder-deck, and the throat-bottom arranged on the upper side of the binder-deck and having its rear part vertically adjustable, of a vertically-movable hand-lever arranged on the lower side of the binder-deck, and a connecting-rod extending from said hand-lever downwardly on the lower side of the binder-deck and around the lower edge of the latter to the throat-bottom, substantially as set forth.

Witness our hands this 23d day of August, 1899.

GEORGE ALBERT FARRALL.
CHRISTIAN MAUL.

Witnesses:
CHAS. B. STONE,
CHAS. W. HUTCHINSON.